March 19, 1946.   J. MacBLANE   2,397,025
AUTOMATIC CHUCK
Filed May 23, 1944

Witness:
Burr W. Jones

INVENTOR.
BY James MacBlane
Clinton S. James
ATTORNEY

Patented Mar. 19, 1946

2,397,025

UNITED STATES PATENT OFFICE 2,397,025

AUTOMATIC CHUCK

James MacBlane, Elmira Heights, N. Y., assignor to Bendix Aviation, South Bend, Ind., a corporation of Delaware Application May 23, 1944, Serial No. 536,990

2 Claims. (Cl. 82—40)

The present invention relates to an automatic chuck and more particularly to a device for gripping and holding a part to be machined which device is automatically closed as a tool is brought up to the work, and released when the tool is backed away.

It is an object of the present invention to provide a novel automatic chuck which is efficient and reliable in operation and simple and economical in construction.

It is another object to provide such a device in which the work is lined up and gripped with a substantially uniform pressure prior to engagement of the tool.

It is a further object of the invention to provide such a device which grips the work quickly and positively, without the use of levers, wrenches or other tools for its operation.

It is another object to provide such a device which automatically ejects the work from the chuck when the tool is backed away from the work.

Figure 1:
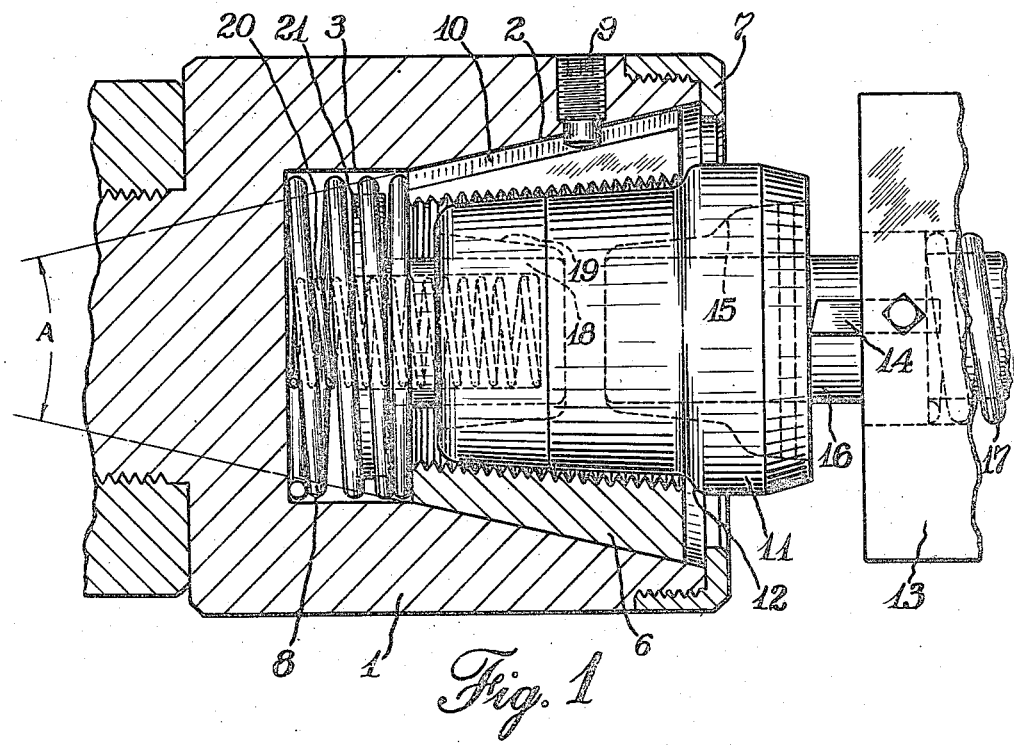
Figure 2:
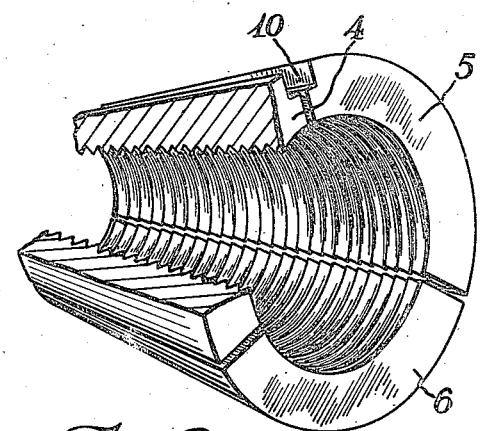

Further objects and advantages will be apparent from the following description taken in connection with the accompanying drawing, in which:

Fig. 1 is a side elevation partly in section of a chuck formed in accordance with the present invention, with a work piece therein and a facing tool operating on the work; and Fig. 2 is a detail in perspective partly broken away of the sliding jaw members of the chuck.

In Fig. 1 there is illustrated a socket member 1 which is adapted to be mounted in the live head of a lathe, not illustrated. The socket member has a tapered or outwardly flared opening 2 which terminates in a cylindrical recess 3, and a plurality of tapered jaw members 4, 5 and 6 whose outer surfaces conform to the tapered opening 2, are slidably mounted therein and are retained by suitable means such as a flanged ring 7 threaded on the end of the socket member 1. Means normally urging the jaw members outwardly to open the jaws is provided in the form of a spring 8 seated in the recess 3 and bearing on the inner ends of the jaws. Rotation of the jaws in the socket member 1 is prevented by suitable means such as a stud 9 threaded in the socket member so as to project into a groove 10 formed by rabbeting the adjacent surfaces of jaws 4 and 5.

The inner surfaces of the jaws 4, 5 and 6 are formed to engage the exterior surface of a work piece 11, said inner surfaces being threaded so as to grip the work piece and resist relative longitudinal movement. The outer surfaces of the jaws 4, 5 and 6 are tapered at such an angle that the jaws will not jam or stick in the opening 2 of the socket member, but will slide freely outward under the action of spring 8 when permitted to do so, thus releasing the grip on the work piece. A suitable non-jamming angle of taper which has been found satisfactory is an included angle A of 25° as indicated in Fig. 1 of the drawing. The inner surfaces of the jaws are formed with a low angle such as 10° for example of taper so that the jaws will grip the work tightly and prevent movement of the work in the jaws. Entry of the work into the jaws is limited by engagement of shoulder 12 of the work piece against the outer ends of the jaws.

A tool holder 13 is adapted to be mounted on the tool slide of the lathe, not illustrated, whereby the tool 14 here shown as a facing tool, may be moved longitudinally into engagement with the end of the work piece. The work piece has a cup-shaped opening 15 in its outer end, and the tool holder 13 carries a plunger 16 slidably mounted therein in position to enter said opening. Spring means 17 in the work holder is provided for yieldably projecting the plunger so that it engages the work piece and presses it into the chuck as the tool holder is brought up to the work. The spring 17 is sufficiently stiff to cause the work and the jaw members 4, 5, 6 to be moved into the socket member 1 against the force of the spring 8 whereby the jaws are caused to grip the work and hold it rigidly prior to engagement of the tool therewith.

When the tool 14 engages the work to perform a facing operation thereon, rotation of the work is permitted by the smooth bearing between the work and the end of plunger 16. If deemed desirable, of course, the plunger 16 may be provided with an anti-friction thrust bearing.

Means are provided for automatically ejecting the work from the chuck as the tool is backed off from the work. As here shown, this is accomplished by providing an ejector thimble 18 arranged to enter a cup-shaped cavity 19 in the inner end of the work, actuated by a light compression spring 20. Outward movement of the thimble under the action of the spring 20 is limited by engagement of a flange 21 on the thimble with the inner ends of jaw members 4, 5, 6.

In operation, the jaw members 4, 5 and 6 are normally projected outwardly by the spring 8 until they engage the flanged ring 7. The work is inserted in the jaws and the tool holder then brought up toward the work until the plunger 16 engages the work and presses it into the chuck.

The work first engages the ejector thimble 18 and compresses spring 20, then as the shoulder 12 engages the outer ends of the jaws, they are constrained to move with the work against the action of the spring 8 and are thereby compressed down onto the work by the wall of the tapered opening 2 so as to firmly hold the work and cause it to rotate with the chuck. Further movement of the tool holder brings the tool 14 into engagement with the end of the work to perform the desired operation thereon, such movement being permitted by compression of the plunger spring 17. When the operation is completed, it is merely necessary to back away the tool holder whereupon the jaws 4, 5, 6 are opened by the action of spring 8, and the work is ejected therefrom by the spring-actuated thimble 18. The parts are then in position to repeat the operation.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In combination a chuck including a socket member having a tapered opening, a plurality of exteriorly tapered jaw members slidably mounted therein, yielding means urging the jaws out of the opening and means for limiting their outward movement; and a tool holder having means for yieldingly engaging a work piece in said jaws and pressing it into the chuck as the tool approaches the work, the means for pressing the work into the chuck comprising a spring actuated plunger slidably mounted in the tool holder in position to engage the work prior to the engagement of the tool carried by the holder.

2. In an automatic chucking device, a socket member having a flared opening, a plurality of jaw members conforming to said opening and slidably mounted therein to thereby grip a work piece inserted in the jaws, means limiting outward movement of the jaws, movable means for holding a tool in position to operate on the work, and means carried by the tool holding means for pressing the work into the socket, the jaws being so formed as to hold the work without slipping, whereby the jaws and work slide together in the socket member; including further a thimble in the chuck adapted to engage the work, and a spring for actuating the thimble to eject the work when released by the jaws, said thimble having a flange adapted to engage the inner ends of the jaws to limit outward movement of the thimble.

JAMES MacBLANE.